United States Patent
Magee et al.

(10) Patent No.: US 7,487,215 B2
(45) Date of Patent: Feb. 3, 2009

(54) METHOD AND SYSTEM FOR DISTRIBUTING A NESTED ELECTRONIC COMMUNICATION TO A PLURALITY OF RECIPIENTS

(75) Inventors: Erich S. Magee, Cary, NC (US); Lisa H. Magee, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 11/015,309

(22) Filed: Dec. 17, 2004

(65) Prior Publication Data

US 2006/0132830 A1 Jun. 22, 2006

(51) Int. Cl.
G06F 15/16 (2006.01)

(52) U.S. Cl. .................. 709/206; 709/204; 709/205; 709/207; 358/1.15

(58) Field of Classification Search .......... 709/204–207
See application file for complete search history.

(56) References Cited

U.S. PATENT DOCUMENTS

| | | | | |
|---|---|---|---|---|
| 5,917,489 A | * | 6/1999 | Thurlow et al. | 715/809 |
| 6,081,832 A | * | 6/2000 | Gilchrist et al. | 709/206 |
| 6,247,045 B1 | * | 6/2001 | Shaw et al. | 709/207 |
| 6,529,942 B1 | * | 3/2003 | Gilbert | 709/206 |
| 6,628,306 B1 | * | 9/2003 | Marchionda | 715/752 |
| 7,130,887 B2 | * | 10/2006 | Goldberg | 709/206 |
| 2003/0051054 A1 | | 3/2003 | Redlich et al. | |
| 2004/0064511 A1 | | 4/2004 | Abdel-Aziz et al. | |

* cited by examiner

*Primary Examiner*—Jeffrey Pwu
*Assistant Examiner*—Farhad Ali
(74) *Attorney, Agent, or Firm*—Schmeiser, Olsen & Watts; John R. Pivnichny

(57) ABSTRACT

A computer system and associated method to distribute an electronic communication object. The electronic communication object comprises a main communication and a first sub-communication object. The first sub-communication object is embedded within a main communication object. The main communication object comprises a first set of attributes and a first addressee. The first sub-communication object comprises a second set of attributes and a second addressee. A hierarchal relationship exists between the main communication object and the first sub-communication object such that the first sub-communication object inherits one or more of the first set of attributes from the main communication object if said one or more of the second set of attributes is not specified in the first sub-communication object. The main communication object and a first outline of the first sub-communication object is sent to the first addressee. The first sub-communication object is sent to the second addressee.

21 Claims, 6 Drawing Sheets

METHOD AND SYSTEM FOR DISTRIBUTING A NESTED ELECTRONIC COMMUNICATION TO A PLURALITY OF RECIPIENTS

BACKGROUND OF THE INVENTION

1. Technical Field

The present invention relates to a system and method to distribute an electronic communication between a plurality of recipients.

2. Related Art

Using multiple communications to relate different levels of information to different audiences is very time consuming and may cause a home or office environment to operate inefficiently and thereby may be costly. Therefore there is a need for using a single communication to relate different levels of information to different audiences.

SUMMARY OF THE INVENTION

The present invention provides a computer system comprising a processor and a computer readable memory unit coupled to the processor, said memory unit containing instructions that when executed by the processor implement a method for electronic communication distribution, said method comprising the computer implemented steps of:

accepting an electronic communication object comprising a first sub-communication object embedded within a main communication object, wherein the main communication object comprises a first set of attributes and a first addressee, wherein the first sub-communication object comprises a second set of attributes and a second addressee, and wherein a hierarchal relationship exists between the main communication object and the first sub-communication object such that the first sub-communication object inherits one or more of said first set of attributes from said main communication object if said one or more of said second set of attributes is not specified in said first sub-communication object;

sending, the main communication object and a first outline of the first sub-communication object to the first addressee; and sending, the first sub-communication object to the second addressee, wherein the first sub-communication object comprises the one or more of said first set of attributes from said main communication object if the one or more of said second set of attributes is not specified in said first sub-communication object.

The present invention provides an electronic communication distribution method comprising:

creating an electronic communication object comprising a first sub-communication object embedded within a main communication object, wherein the main communication object comprises a first set of attributes and a first addressee, wherein the first sub-communication object comprises a second set of attributes and a second addressee, and wherein a hierarchal relationship exists between the main communication object and the first sub-communication object such that the first sub-communication object inherits one or more of said first set of attributes from said main communication object if said one or more of said second set of attributes is not specified in said first sub-communication object;

sending the electronic communication object to a computing apparatus;

sending by the computing apparatus, the main communication object and a first outline of the first sub-communication object to the first addressee; and sending by the computing apparatus, the first sub-communication object to the second addressee, wherein the first sub-communication object comprises the one or more of said first set of attributes from said main communication object if the one or more of said second set of attributes is not specified in said first sub-communication object.

The present invention advantageously provides a system and associated method to using a single communication to relate different levels of information to different audiences.

DETAILED DESCRIPTION OF THE INVENTION

Figure 1:
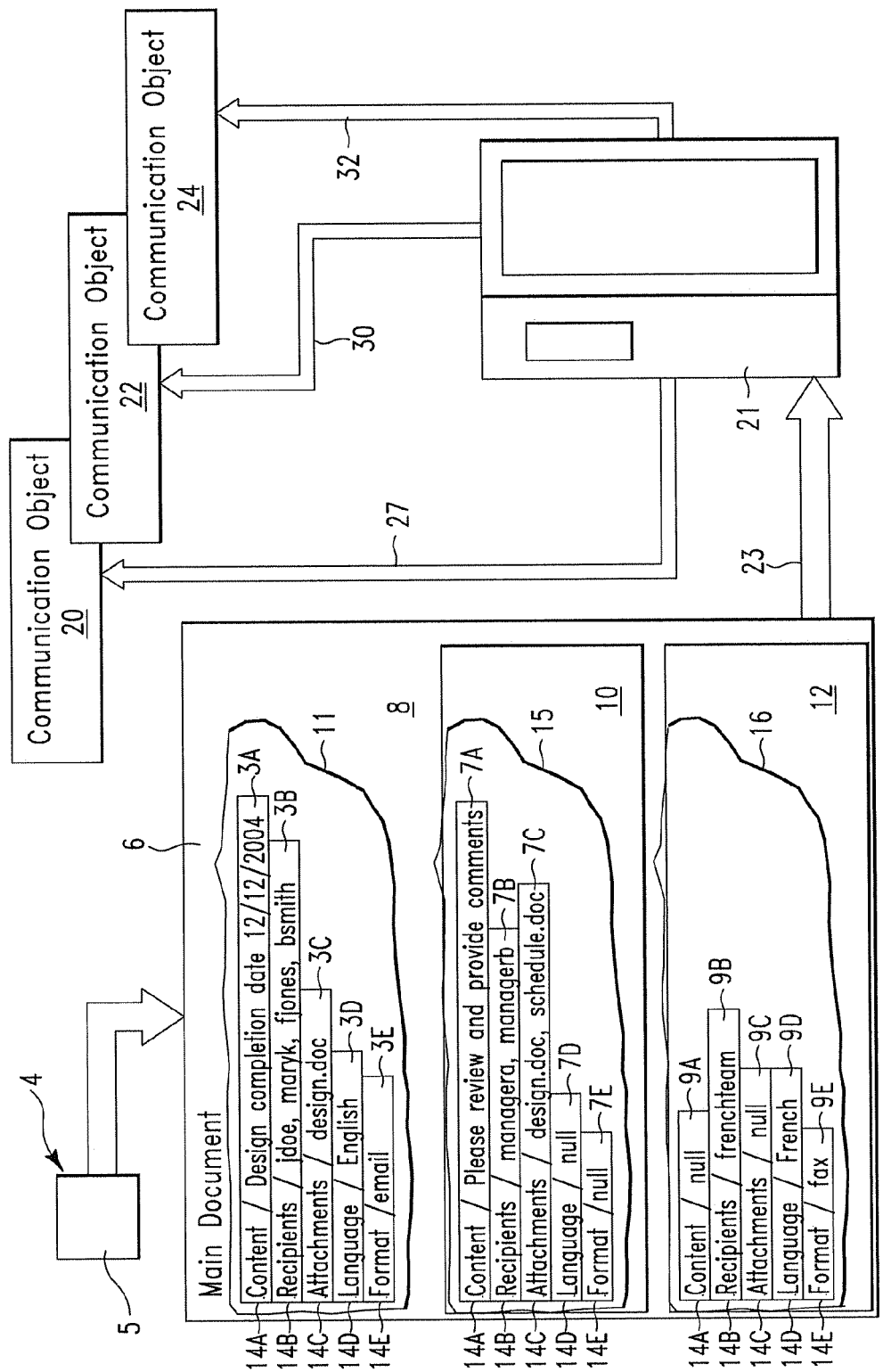
FIG. 1 illustrates an example of an electronic communication distribution system, in accordance with embodiments of the present invention.

FIG. 1 illustrates an example of an electronic communication distribution system 2, in accordance with embodiments of the present invention. The electronic communication distribution system 2 allows a user to compose an electronic communication object 6 that comprises at least one nested sub-communication object (i.e., sub-communication objects 10 and 12) embedded within a main electronic communication object 8. The electronic communication object 6 is defined herein as a module (e.g., an email, a text message, etc.) comprising distinct portions (e.g., main electronic communication object 8 and sub-communication objects 10 and 12). Each of the distinct portions (e.g., main electronic communication object 8 and sub-communication objects 10 and 12) comprises a plurality of elements (e.g., plurality of elements 11, 15, and 16). Each element comprises an identifier (e.g., identifiers 14A . . . 14E) and an attribute (e.g., attributes, 3A . . . 3E, 7A . . . 7E, and 9A . . . 9E). An attribute is defined herein as information (e.g., attachments, text, etc.) to be sent to a plurality of specified addresses (e.g., recipients 3B, 7B, and 9B), a presentation format (e.g., language, format such as, inter alia, e-mail, fax, voice mail, etc.) of the information to be sent, and/or the plurality of specified addresses (e.g., recipients 3B, 7B, and 9B). An identifier is defined herein identification tag for the attribute. For example, identifier 14A (content) in main electronic communication object 8 is an identification tag for the attribute 3A (Design completion date is Dec. 12, 2004). An attribute may be, inter alia, information (e.g., a text message in an email such as messages 3A and 7A in FIG. 1), a document attachment(s) (e.g., a document attachment in an email such as document attachments 3C and 7C in FIG. 1), transmission format instructions for transmitting the message(s) and/or document attachment(s) (e.g., transmission formats such as, inter alia, email, fax, text message, etc.), formats for the message(s) and/or document attachment(s) (e.g., language format, text format, etc). The electronic communication object 6 may be any communication object known to a person of ordinary skill in the art including, inter alia, an email, a voice mail, a text message, etc. The sub-communication object 12 is embedded within the sub-communication object 10 and the sub-communication object 10 is embedded within the main electronic communication object 8. A computing apparatus 21 (e.g., a server) comprises software to divide the main electronic communication object 8 and each of the sub-communication objects 10 and 12 into separate communication objects 20, 22, and 24 (described in detail w reference to FIGS. 2, 3, and 4 respectively) and send the separate communication objects 20, 22, and 24 to different groups of recipients 3B, 7B, and 9B (i.e., addressees). The main electronic communication object 8 comprises a plurality of elements 11. The plurality of elements 11 comprises attributes 3A . . . 3E and the associated identifiers 14A . . . 14E. The sub-communication object 10 comprises a plurality of elements 15. The plurality of elements 15 comprises attributes 7A . . . 7E and the associated identifiers 14A . . . 14E. The sub-communication object 12 comprises a plurality of elements 16. The plurality of elements 16 comprises attributes 9A . . . 9E and the associated identifiers 14A . . . 14E. Note that the elements 11, 15, and 16 comprising content, recipients, attachments, language, and format are shown for illustration purposes and that the main electronic communication object 8 and the sub-communication objects 10 and 12 may comprise any elements. A hierarchal relationship exists within the electronic communication object 6 between the main electronic communication object 8, the sub-communication object 10, and the sub-communication object 12. The hierarchal relationship that exists within the electronic communication object 6 defines inheritance properties between attributes 3A . . . 3E within the main electronic communication object 8, attributes 7A . . . 7E within the sub-communication object 10, and attributes 9A . . . 9E within the sub-communication object 12. The sub-communication object 12 comprises a lowest level in the hierarchal relationship and therefore the sub-communication object 12 automatically inherits one or more of attributes 7A . . . 7E from the sub-communication object 10 comprising a same identifier as one or more of attributes 9A . . . 9E if the one or more of attributes 9A . . . 9E are not specified (e.g., in FIG. 1 the term "null" listed as attribute 9A and 9C of sub-communication object 12 represents that attributes 9A and 9C are not specified and therefore indicates attribute inheritance to attributes 9A and 9C from attributes 7A and 7C of sub-communication object 10). The inherited attributes from sub-communication object 10 to sub-communication object 12 are applied to the separated communication object 24 (i.e., derived from sub-communication object 12) received by the french team (see description of FIG. 4). Additionally, if one or more of attributes 7A . . . 7E (i.e., to be inherited to non-specified one or more of attributes 9A . . . 9E as described, supra) are not specified, the sub-communication object 12 will automatically inherit one or more of attributes 3A . . . 3E. The sub-communication object 10 comprises a lower level in the hierarchy than the main communication object 8 and therefore the sub-communication object 10 automatically inherits one or more of attributes 3A . . . 3E from the main communication object 8 unless comprising a same identifier as one or more of attributes 7A . . . 7E if the one or more of attributes 7A . . . 7E are not specified (e.g., in FIG. 1 the term "null" listed as attribute 7D and 7E of sub-communication object 10 indicates attribute inheritance to attributes 7D and 7E from attributes 3D and 3E of main communication object 8). The inherited attributes from main communication object 8 to sub-communication object 10 are applied to the separated communication object 22 (i.e., derived from sub-communication object 10) received by managera, managerb (see description of FIG. 3). The main communication object 8 comprises a highest level in the hierarchy and therefore the main communication object 8 does not inherit any attributes. In general, within an electronic communication object (e.g., an email, a text message, etc.) comprising nested sub-communication objects comprising the hierarchal relationship as described, supra, non-specified attributes in a first sub-communication object will inherit attributes comprising a same identifier from a second sub-communication object in a higher level (e.g., first sub-communication object and the second sub-communication object may be multiple levels apart) in the hierarchal relationship that comprises specified attributes. The first sub-communication object comprising non-specified attributes will search sub-communication objects in higher levels in the hierarchal relationship until a specified attribute comprising a same identifier is found.

The electronic communication distribution system 2 is activated by a composer 4. The composer 4 composes the electronic communication object 6 and sends the electronic communication object 6 to a computing apparatus 21 (e.g., a server) through the communication link 23. In turn the computing apparatus 21 comprising software divides the main electronic communication object 8 and each of the sub-communication objects 10 and 12 into the separate communication objects 20, 22, and 24 (described in detail w reference to FIGS. 2, 3, and 4 respectively) and sends the separate communication objects 20, 22, and 24 through the links 27, 30, and 32 to the different groups of recipients 15, 17, and 19 (i.e., addressees). The composer 4 may compose the electronic communication object 6 using a computing apparatus 5. Any computing apparatus known to a person of ordinary skill in the art may be used including, inter alia, a computer, a personal digital assistant (PDA), etc.

Figure 2:
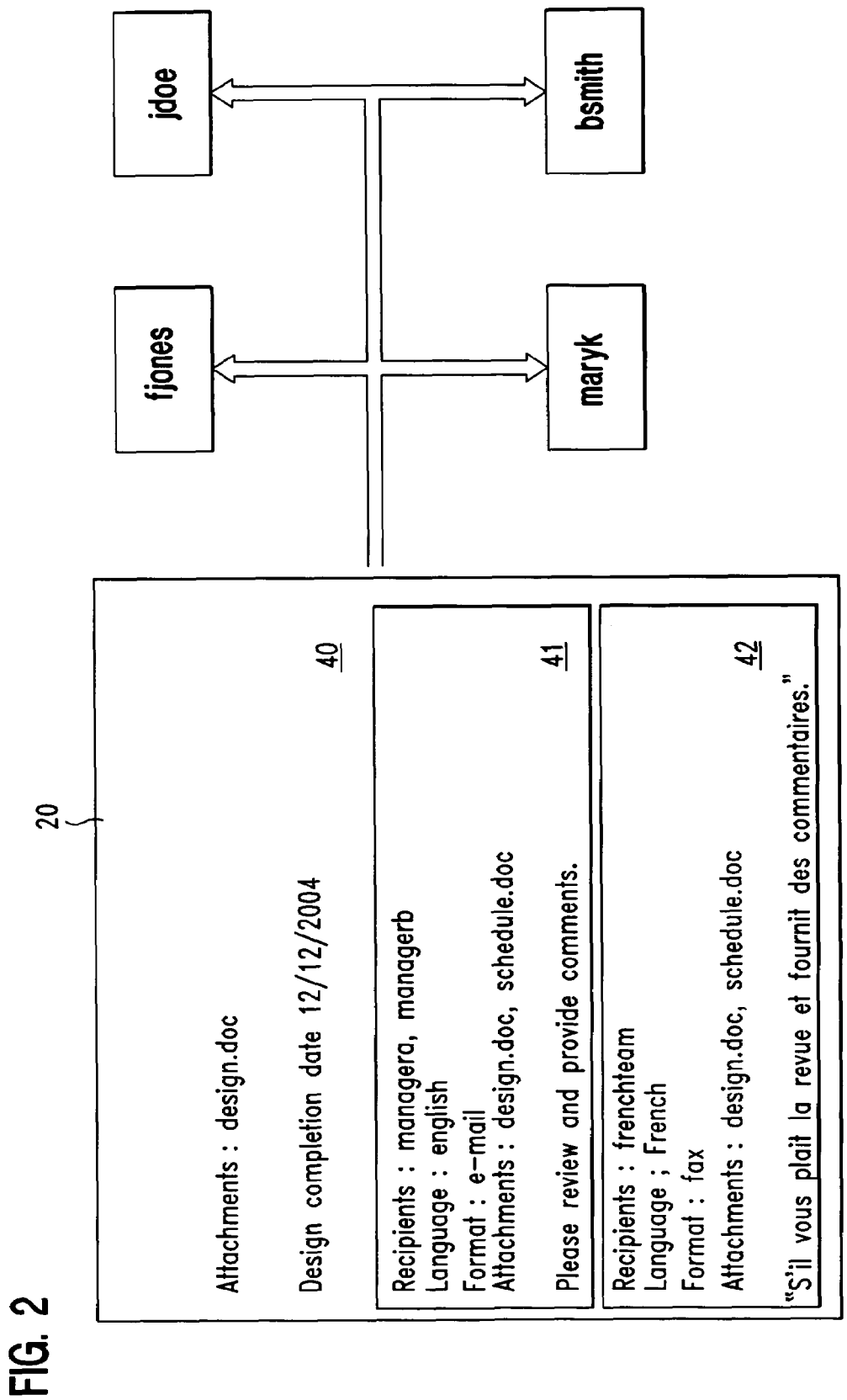
FIG. 2 illustrates a detailed view of a main communication object from FIG. 1, in accordance with embodiments of the present invention.

FIG. 2 illustrates a detailed view of the communication object 20 from FIG. 1, in accordance with embodiments of the present invention. The communication object 20 is received by the recipients jdoe, maryk, fjones, and bsmith as specified by attribute 3B in FIG. 1. A hierarchal relationship exists within the electronic communication object 6 of FIG. 1 between the main electronic communication object 8, the sub-communication object 10, and the sub-communication object 12 and therefore the separated communication object 20 received by the recipients jdoe, maryk, fjones, and bsmith comprises information 40 in a format specified by attributes 3A . . . 3E from the original main electronic communication object 8, an outline 41 of information 50 (see FIG. 3) to be received by recipients mangera, managerb (see FIGS. 1 and 3), and an outline 42 of information 59 (see FIG. 4) to be received by french team (see FIGS. 1 and 4). The communication object 20 is received by recipients jdoe, maryk, fjones, and bsmith as an email in English as specified by the attributes 3D and 3E in the original main electronic communication object 8 of FIG. 1. Likewise, the information 40 comprises the content "Design completion date is 12/12/2004" and the attachment "design.doc" as specified by the attributes 3A and 3C from the original main electronic communication object 8 of FIG. 1. The outline 41 illustrates to jdoe, maryk, fjones, and bsmith, a summary of information 50 to be received by the recipients mangera, managerb (see FIGS. 1 and 3). The summary illustrates that the recipients mangera, managerb will receive content "Please review and provide comments" and the attachments "design.doc" and "schedule.doc" as specified by the attributes 7A and 7C from the sub-communication object 10 of FIG. 1. Additionally, the summary illustrates that the recipients mangera, managerb will receive the content "Please review and provide comments" and the attachments "design.doc" and "schedule.doc" as an email in English because the attributes 7D and 7E from the sub-communication object 10 of FIG. 1 were not specified (i.e., listed as null) and therefore the separated communication object 22 will inherit (i.e., to attributes 7D and 7E) the attributes 3D and (English) and 3E (email) from the main communication object 8. The outline 42 illustrates to the recipients jdoe, maryk, fjones, and bsmith, a summary of information 59 (see FIG. 4) to be received by the recipients french team (see FIGS. 1 and 4). The summary illustrates that the recipients french team will receive content "Please review and provide comments" and the attachments "design.doc" and "schedule.doc" inherited from attributes 7A and 7C of FIG. 1 because the attributes 9A and 9C from the sub-communication object 12 of FIG. 1 were not specified (i.e., listed as null) and therefore the separated communication object 24 will inherit (i.e., to the attributes 9A and 9C), the attributes 7A (Please review and provide comments) and 7C ("design.doc" and "schedule.doc") from the sub-communication object 10 of FIG. 1. The recipients french team will receive the communication object 24 comprising the attributes 7A (Please review and provide comments) and 7C ("design.doc" and "schedule.doc") in french as a fax as specified by attributes 9D and 9E in the sub-communication object 12 of FIG. 1. Therefore the content "Please review and provide comments" is translated in the communication object 24 into french as "S'il vous plait la revue et fournit des commentaries"

Figure 3:
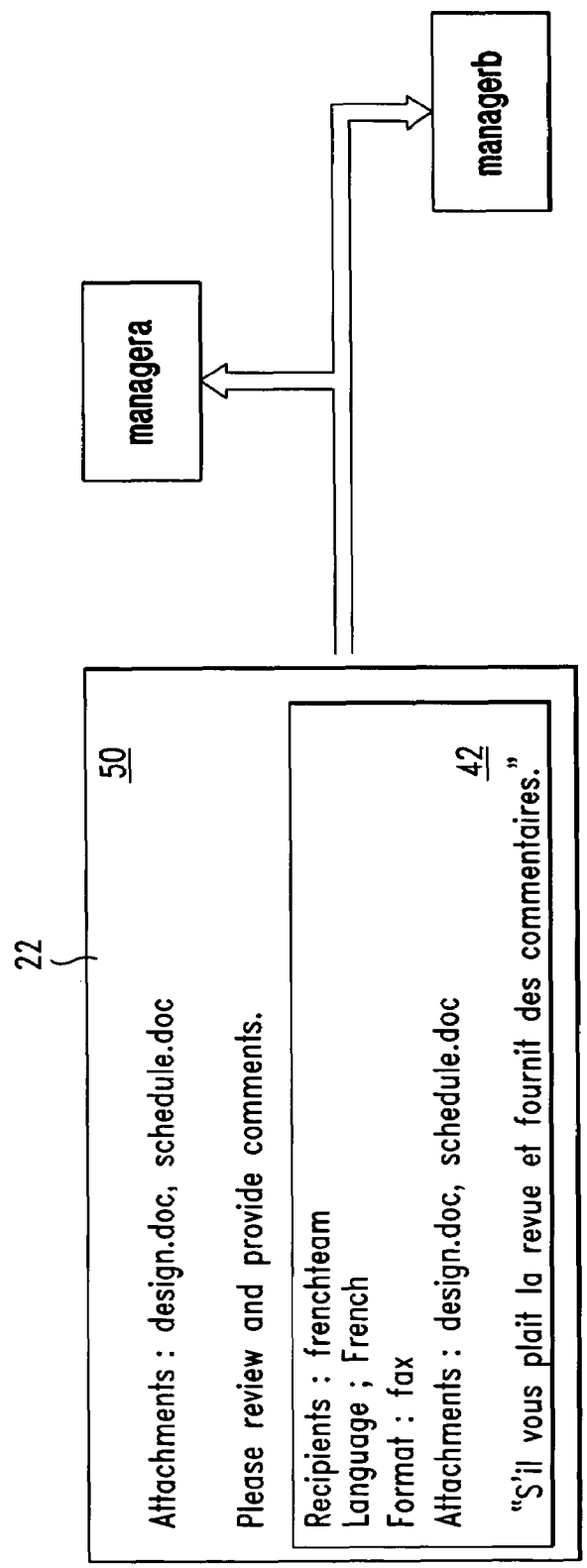
FIG. 3 illustrates a detailed view of a first sub-communication object from FIG. 1, in accordance with embodiments of the present invention.

FIG. 3 illustrates a detailed view of the communication object 22 from FIG. 1, in accordance with embodiments of the present invention. The communication object 22 is received by recipients managera and managerb. A hierarchal relationship exists within the electronic communication object 6 of FIG. 1 between the main electronic communication object 8, the sub-communication object 10, and the sub-communication object 12 and therefore the separated communication object 22 received by the recipients managera and managerb comprises information 50 and the outline 42 of information 59 (see FIG. 4) to be received by recipients french team. The recipients, managera and managerb will receive content "Please review and provide comments" and the attachments "design.doc" and "schedule.doc" as specified by the attributes 7A and 7C from the sub-communication object 10 of FIG. 1. Additionally, the summary illustrates that the recipients mangera, managerb will receive the content "Please review and provide comments" and the attachments "design.doc" and "schedule.doc" as an email in English because the attributes 7D and 7E from the sub-communication object 10 of FIG. 1 were not specified (i.e., listed as null) and therefore the separated communication object 22 will inherit (i.e., to attributes 7D and 7E) the attributes 3D and (English) and 3E (email) from the main communication object 8. The outline 42 illustrates to the recipients managera and managerb, a summary of information to be received by the recipients french team (see FIGS. 1 and 4). The summary illustrates that the recipients french team will receive content "Please review and provide comments" and the attachments "design.doc" and "schedule.doc" inherited from attributes 7A and 7C of FIG. 1 because the attributes 9A and 9C from the sub-communication object 12 of FIG. 1 were not specified (i.e., listed as null) and therefore the separated communication object 24 will inherit (i.e., to the attributes 9A and 9C), the attributes 7A (Please review and provide comments) and 7C ("design.doc" and "schedule.doc") from the sub-communication object 10 of FIG. 1. The recipients french team will receive the communication object 24 comprising the attributes 7A (Please review and provide comments) and 7C ("design.doc" and "schedule.doc") in french as a fax as specified by attributes 9D and 9E in the sub-communication object 12 of FIG. 1. Therefore the content "Please review and provide comments" is translated in the communication object 24 into french as "S'il vous plait la revue et fournit des commentaries".

Figure 4:
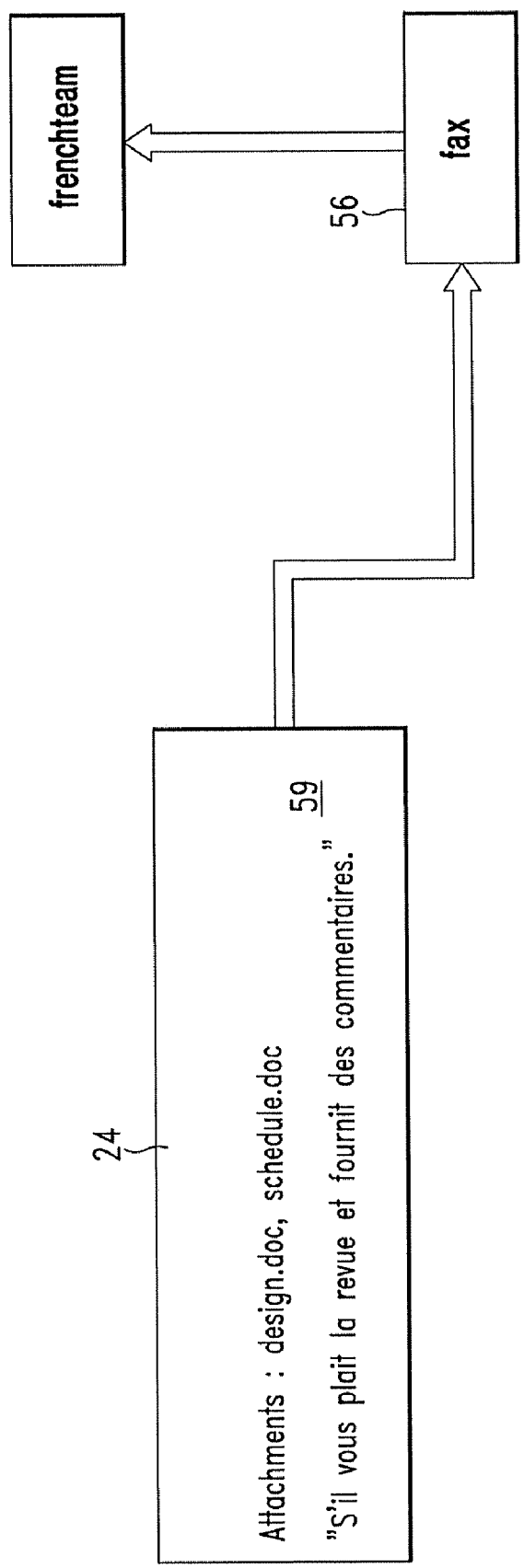
FIG. 4 illustrates a detailed view of a second sub-communication object from FIG. 1, in accordance with embodiments of the present invention.

FIG. 4 illustrates a detailed view of the communication object 24 from FIG. 1, in accordance with embodiments of the present invention. The communication object 24 is received by recipients french team. A hierarchal relationship exists within the electronic communication object 6 of FIG. 1 between the main electronic communication object 8, the sub-communication object 10, and the sub-communication object 12 and therefore the separated communication object 24 received by the french team comprises information 59 comprising content "Please review and provide comments" and the attachments "design.doc" and "schedule.doc" inherited from attributes 7A and 7C of FIG. 1 because the attributes 9A and 9C from the sub-communication object 12 of FIG. 1 were not specified (i.e., listed as null) and therefore the separated communication object 24 will inherit (i.e., to the attributes 9A and 9C), the attributes 7A (Please review and provide comments) and 7C ("design.doc" and "schedule.doc") from the sub-communication object 10 of FIG. 1. The recipients french team will receive the communication object 24 comprising the attributes 7A (Please review and provide comments) and 7C ("design.doc" and "schedule.doc") in french as a fax 56 as specified by attributes 9D and 9E in the sub-communication object 12 of FIG. 1. Therefore the content "Please review and provide comments" is translated in the communication object 24 into french as "S'il vous plait la revue et fournit des commentaries".

Figure 5:
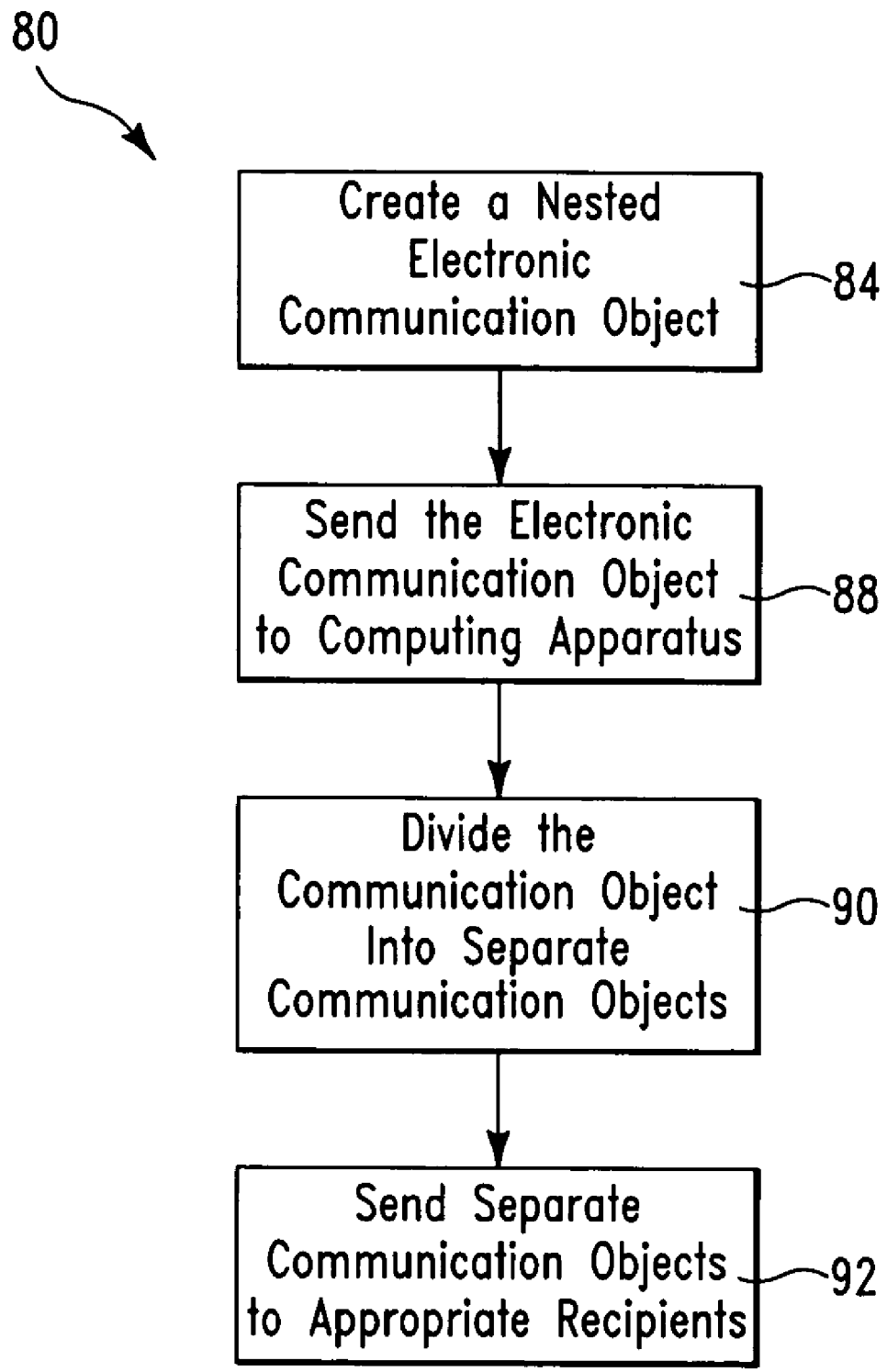
FIG. 5 is a flowchart showing an algorithm describing the electronic communication distribution system of FIG. 1, in accordance with embodiments of the present invention.

FIG. 5 is a flowchart showing an algorithm 80 describing the electronic communication distribution system 2 of FIG. 1, in accordance with embodiments of the present invention. In step 84 a composer (i.e., a person or people) composes an electronic communication object. The electronic communication object comprises at least one nested sub-communication object embedded within a main electronic communication object. In step 88 the composer sends the electronic communication object to a computing apparatus (e.g., a server). In step 90 the computing apparatus divides the main electronic communication object and each of the at least one sub-communication object into the separate communication objects (described in detail w reference to FIGS. 1-4). In step 92 the computing apparatus sends the separate communication objects to different groups of recipients (i.e., addressees) designated by the electronic communication object.

Figure 6:
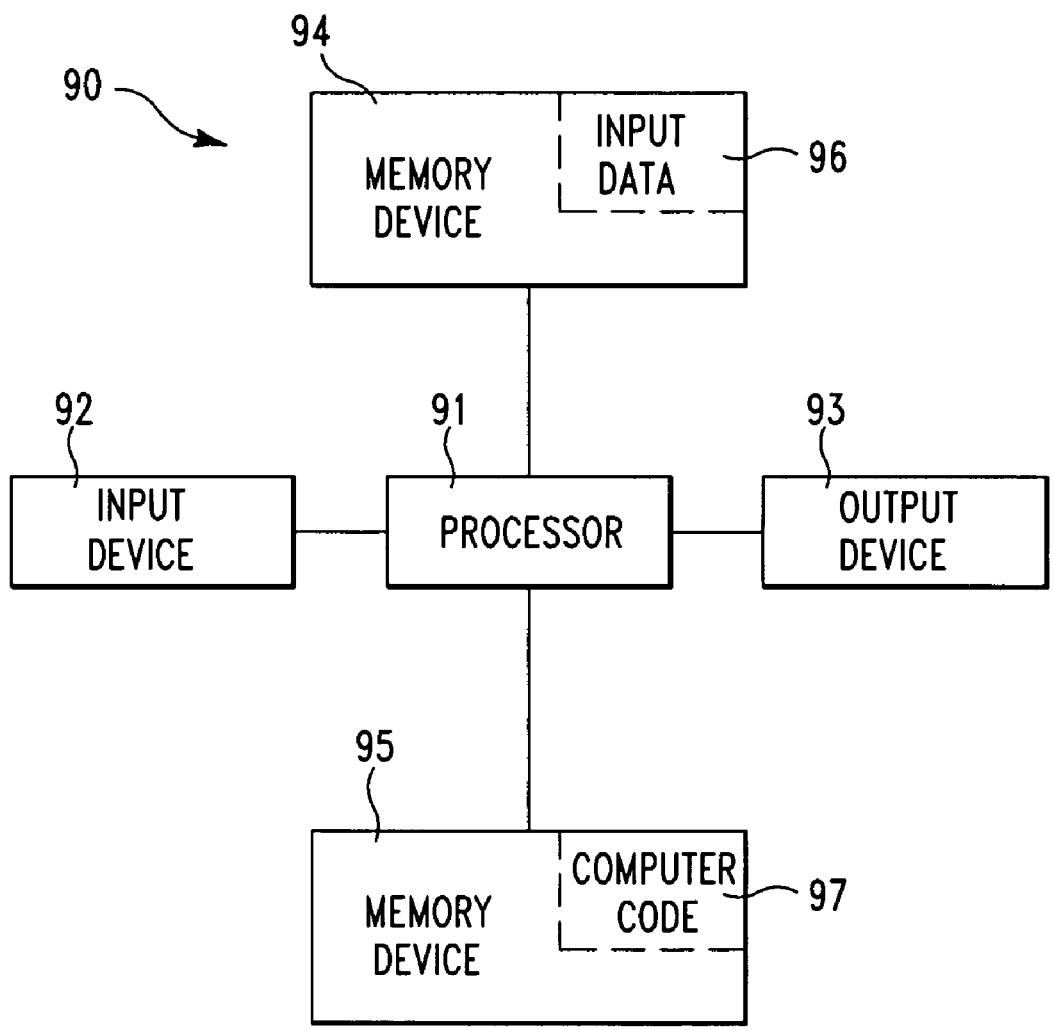
FIG. 6 illustrates a computer system used for the electronic communication distribution system of FIG. 1 of the present invention.

FIG. 6 illustrates a computer system 90 used for implementing the electronic communication distribution system 2 and associated method of FIG. 1 of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm(s) for dividing and distributing the electronic communication of the present invention. The processor 91 executes the computer code 97.

The memory device 94 includes input data 96. The computer system 90 may relate to the computing apparatus 21 of FIG. 1. The input data 96 includes input required by the computer code 97. The output device 93 displays output from the computer code 97. Either or both memory devices 94 and 95 (or one or more additional memory devices not shown in FIG. 6) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising a processor and a computer readable memory unit coupled to the processor, said memory unit containing instructions that when executed by the processor implement a method for electronic communication distribution, said method comprising the computer implemented steps of:

accepting an electronic communication object comprising a first sub-communication object embedded within a main communication object, wherein the main communication object comprises a first set of attributes, first text message comprising first text, and a first addressee, wherein said first set of attributes comprises a first language attribute and a first attachment attribute that includes a first document attachment attached to said main communication object, wherein the first sub-communication object comprises a second set of attributes, a second text message comprising second text differing from said first text, and a second addressee, wherein said second set of attributes comprises a second language attribute and a second attachment attribute that includes a second document attachment attached to said sub-communication object, wherein said first document attachment differs from said second document attachment, wherein said first sub-communication object does not comprise said first text message comprising said first text, and wherein a hierarchal relationship exists between the main communication object and the first sub-communication object such that the first sub-communication object inherits one or more of said first set of attributes from said main communication object if said one or more of said second set of attributes is not specified in said first sub-communication object;

separating the first sub-communication object from the main communication object;

sending, the main communication object, said first document attachment, and a separate first outline of the first sub-communication object to the first addressee in a first language associated with said first language attribute via a first transmission means; and sending, the first sub-communication object and said second document attachment to the second addressee in a second language associated with said second language attribute via a second transmission means, wherein said first language differs from said second language, wherein said first transmission means differs from said second transmission means, wherein the first sub-communication object comprises the one or more of said first set of attributes from said main communication object if the one or more of said second set of attributes is not specified in said first sub-communication object.

2. The computer system of claim 1, wherein said first outline comprises a first list defining said second set of attributes.

3. The computer system of claim 1, wherein the first addressee and the second addressee each comprise a plurality of addressees.

4. The computer system of claim 1, wherein the electronic communication object further comprises a second sub-communication object embedded within the main communication object, wherein the second communication object comprises a third set of attributes and a third addressee, wherein a hierarchal relationship exists between the first sub-communication object and the second sub-communication object such that the second sub-communication object inherits one or more of said second set of attributes from said first sub-communication object if said one or more of said third set of attributes is not specified in said second sub-communication object, and wherein said method further comprises the computer implemented steps of;

sending by the computing apparatus, a second outline of the second sub-communication object to the first addressee and the second addressee; and sending by the computing apparatus, the second sub-communication object to the third addressee, wherein the second sub-communication object comprises said one or more of said second set of attributes from said first sub-communication object if said one or more of said third set of attributes is not specified in said second sub-communication object.

5. The computer system of claim 4, wherein the second outline comprises a second list defining said third set of attributes.

6. The computer system of claim 4, wherein the third addressee comprises a plurality of addressees.

7. The computer system of claim 4, wherein each of the first set of attributes, each of the second set of attributes, and each of the third set of attributes are each selected form the group consisting of text data, visual data, document attachments, language presentation, and sending format.

8. The computer system of claim 7, wherein the sending format is selected form the group consisting of an email, a fax, and an instant message.

9. The computer system of claim 1, wherein the electronic communication object further comprises a second sub-communication object embedded within the main communication object, wherein the second communication object comprises a third set of attributes and a third addressee, wherein a hierarchal relationship exists between the main communication object, the first sub-communication object, and the second sub-communication object such that the second sub-communication object inherits one or more of said first set of attributes from said main communication object if said one or more of said third set of attributes is not specified in said second sub-communication object and said one or more of said second set of attributes is not specified in said first sub-communication object, and wherein said method further comprises the computer implemented steps of;

sending by the computing apparatus, a second outline of the second sub-communication object to the first addressee and the second addressee; and sending by the computing apparatus, the second sub-communication object to the third addressee, wherein the second sub-communication object comprises said one or more of said first set of attributes from said main communication object if said one or more of said third set of attributes is not specified in said second sub-communication object and said one or more of said second set of attributes is not specified in said first sub-communication object.

10. The computer system of claim 9, wherein said second outline comprises a second list defining said third set of attributes.

11. An electronic communication distribution method comprising:
   accepting an electronic communication object comprising a first sub-communication object embedded within a main communication object, wherein the main communication object comprises a first set of attributes, a first text message comprising first text, and a first addressee, wherein said first set of attributes comprises a first language attribute and a first attachment attribute that includes a first document attachment attached to said main communication object, wherein the first sub-communication object comprises a second set of attributes, a second text message comprising second text differing from said first text, and a second addressee, wherein said second set of attributes comprises a second language attribute and a second attachment attribute that includes a second document attachment attached to said sub-communication object, wherein said first document attachment differs from said second document attachment, wherein said first sub-communication object does not comprise said first text message comprising said first text, and wherein a hierarchal relationship exists between the main communication object and the first sub-communication object such that the first sub-communication object inherits one or more of said first set of attributes from said main communication object if said one or more of said second set of attributes is not specified in said first sub-communication object;
   separating the first sub-communication object from the main communication object;
   sending, the main communication object, said first document attachment, and a separate first outline of the first sub-communication object to the first addressee in a first language associated with said first language attribute via a first transmission means; and
   sending, the first sub-communication object and said second document attachment to the second addressee in a second language associated with said second language attribute via a second transmission means, wherein said first language differs from said second language, wherein said first transmission means differs from said second transmission means, wherein the first sub-communication object comprises the one or more of said first set of attributes from said main communication object if the one or more of said second set of attributes is not specified in said first sub-communication object.

12. The electronic communication distribution method of claim 11, wherein said first outline comprises a first list defining said second set of attributes.

13. The electronic communication distribution method of claim 11, wherein the first addressee and the second addressee each comprise a plurality of addressees.

14. The electronic communication distribution method of claim 11, wherein the electronic communication object further comprises a second sub-communication object embedded within the main communication object, wherein the second communication object comprises a third set of attributes and a third addressee, wherein a hierarchal relationship exists between the first sub-communication object and the second sub-communication object such that the second sub-communication object inherits one or more of said second set of attributes from said first sub-communication object if said one or more of said third set of attributes is not specified in said second sub-communication object, and wherein said method further comprises;
   sending by the computing apparatus, a second outline of the second sub-communication object to the first addressee and the second addressee; and
   sending by the computing apparatus, the second sub-communication object to the third addressee, wherein the second sub-communication object comprises said one or more of said second set of attributes from said first sub-communication object if said one or more of said third set of attributes is not specified in said second sub-communication object.

15. The electronic communication distribution method of claim 14, wherein the second outline comprises a second list defining said third set of attributes.

16. The electronic communication distribution method of claim 14, wherein the third addressee comprises a plurality of addressees.

17. The electronic communication distribution method of claim 14, wherein each of the first set of attributes, each of the second set of attributes, and each of the third set of attributes are each selected from the group consisting of text data, visual data, document attachments, language presentation, and sending format.

18. The electronic communication distribution method of claim 17, wherein the sending format is selected form the group consisting of an email, a fax, and an instant message.

19. The electronic communication distribution method of claim 11, wherein the electronic communication object further comprises a second sub-communication object embedded within the main communication object, wherein the second communication object comprises a third set of attributes and a third addressee, wherein a hierarchal relationship exists between the main communication object, the first sub-communication object, and the second sub-communication object such that the second sub-communication object inherits one or more of said first set of attributes from said main communication object if said one or more of said third set of attributes is not specified in said second sub-communication object and said one or more of said second set of attributes is not specified in said first sub-communication object, and wherein said method further comprises;
   sending by the computing apparatus, a second outline of the second sub-communication object to the first addressee and the second addressee; and
   sending by the computing apparatus, the second sub-communication object to the third addressee, wherein the second sub-communication object comprises said one or more of said first set of attributes from said main communication object if said one or more of said third set of attributes is not specified in said second sub-communication object and said one or more of said second set of attributes is not specified in said first sub-communication object.

20. The electronic communication distribution method of claim 19, wherein the second outline comprises a second list defining said third set of attributes.

21. The computer system of claim 1, wherein said first transmission means comprises an email, and wherein said second transmission means comprises a fax.

* * * * *